(12) United States Patent
Persson

(10) Patent No.: US 12,060,937 B2
(45) Date of Patent: Aug. 13, 2024

(54) TRANSMISSION OF A VEHICLE

(71) Applicant: VOLVO TRUCK CORPORATION, Gothenburg (SE)

(72) Inventor: Marcus Persson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 133 days.

(21) Appl. No.: 17/830,394

(22) Filed: Jun. 2, 2022

(65) Prior Publication Data

US 2022/0390010 A1 Dec. 8, 2022

(30) Foreign Application Priority Data

Jun. 4, 2021 (EP) ..................................... 21177748

(51) Int. Cl.
*F16H 61/682* (2006.01)
*F16H 61/12* (2010.01)
*F16H 61/70* (2006.01)

(52) U.S. Cl.
CPC ........... *F16H 61/682* (2013.01); *F16H 61/12* (2013.01); *F16H 61/702* (2013.01); *F16H 61/705* (2013.01); *F16H 2061/1236* (2013.01)

(58) Field of Classification Search
CPC ...... F16H 61/682; F16H 61/12; F16H 61/702; F16H 61/705; F16H 2061/1236
USPC ...................................................... 74/473.11
See application file for complete search history.

(56) References Cited

U.S. PATENT DOCUMENTS

| | | | | |
|---|---|---|---|---|
| 5,899,121 A | * | 5/1999 | Mulvihill | ............ F16H 63/3023 |
| | | | | 74/335 |
| 6,658,961 B2 | * | 12/2003 | Lee | ......................... F16H 59/10 |
| | | | | 74/473.11 |
| 2011/0314945 A1 | * | 12/2011 | Brandenburg | ...... F16H 61/0031 |
| | | | | 74/473.11 |
| 2012/0272770 A1 | * | 11/2012 | Kelpe | ..................... F16H 63/38 |
| | | | | 74/473.11 |

FOREIGN PATENT DOCUMENTS

| | | |
|---|---|---|
| EP | 0552867 A1 | 7/1993 |
| EP | 0552872 A1 | 7/1993 |
| EP | 0927838 A1 | 7/1999 |

OTHER PUBLICATIONS

Extended European Search Report, EP21177748.7, mailed Nov. 9, 2021, 6 pages.

* cited by examiner

*Primary Examiner* — T. Scott Fix
(74) *Attorney, Agent, or Firm* — Sage Patent Group

(57) ABSTRACT

An automated manual transmission, comprising:
  a transmission control unit,
  a shift rod movable between a predetermined first position in which it engages a first gear combination of the transmission, a predetermined second position in which it engages a second gear combination of the transmission, and a predetermined neutral position in which it does not engage any gear,
  an actuator for moving the shift rod between the first position, the second position and the neutral position by applying a fluid pressure acting on the shift rod in response to signals from the transmission control unit,
  mechanical engagement means for maintaining the first and second positions of the shift rod without applying any fluid pressure by means of the actuator, (Continued)

wherein the transmission is adapted to maintain the neutral position of the shift rod solely by applying fluid pressure acting on the shift rod.

14 Claims, 2 Drawing Sheets

TRANSMISSION OF A VEHICLE

CROSS REFERENCE TO RELATED APPLICATIONS

This application claims foreign priority to European Patent Application No. 21177748.7, filed on Jun. 4, 2021, the disclosures and content of which are incorporated by reference herein in their entirety.

TECHNICAL FIELD

The invention relates to an automated manual transmission and to a vehicle.

The invention can be applied in heavy-duty vehicles, such as trucks, buses and construction equipment. Although the invention will be described with respect to a heavy-duty truck, the invention is not restricted to this particular vehicle, but may also be used in other vehicles such as passenger cars and light-weight trucks.

BACKGROUND

There are many types of power transmissions for vehicles, including manual transmissions and different types of automatic transmissions. For example, it is known to use automated manual transmissions (AMT) for e.g. trucks. The gear shifts in an AMT are commonly performed by hydraulic or pneumatic actuators, which are controlled by a transmission control unit. The gear shifts are initiated by the transmission control unit based on manual input from a driver and/or based on information relating to vehicle speed, acceleration, weight, road grade, torque demand etc. Each actuator comprises a piston arranged in a cylinder having one or more filling chambers connected to a hydraulic or pneumatic system by means of valves. To initiate a gear shift, the valves are controlled to selectively pressurize the filling chambers and thereby move the piston, in turn acting on a shift rod connected to a shift fork used to engage a specific gear combination.

The shift rod may be movable by means of the actuator between predetermined positions in which different gear combinations of the transmission are engaged, typically between a first and a second position and a neutral position, in which the shift fork does not engage any gear combination. In order to ensure that the shift rod does not move once the desired position is reached, a mechanical engagement means is provided. The mechanical engagement means maintains the shift rod in the predetermined position without having to apply fluid pressure acting on the shift rod by means of the actuator.

SUMMARY

An object of the invention is to provide an automated manual transmission that is in at least some aspect improved with respect to known automated manual transmissions.

According to a first aspect of the invention, the object is achieved by an automated manual transmission according to claim 1, hereinafter also referred to as a transmission.

The transmission comprises:
a transmission control unit,
a shift rod movable between a predetermined first position in which it engages a first gear combination of the transmission, a predetermined second position in which it engages a second gear combination of the transmission, and a predetermined neutral position in which it does not engage any gear,
an actuator for moving the shift rod between the first position, the second position and the neutral position by applying a fluid pressure acting on the shift rod in response to signals from the transmission control unit,
mechanical engagement means for maintaining the first and second positions of the shift rod without applying any fluid pressure by means of the actuator,
wherein the transmission is adapted to maintain the neutral position of the shift rod solely by applying fluid pressure acting on the shift rod by means of the actuator.

According to the invention, the transmission is adapted to maintain the neutral position of the shift rod by controlling the actuator to apply a fluid pressure sufficient to maintain the shift rod in the neutral position without the use of any additional engagement means, such as mechanical engagement means, that are otherwise used to maintain the shift rod in one of its predetermined positions.

By the provision of a transmission which is adapted to maintain the neutral position of the shift rod solely by applying fluid pressure acting on the shift rod, i.e. without using any mechanical engagement means, manufacturing costs associated with the provision of mechanical engagement means can be reduced at the same time as a robust transmission is achieved. This is particularly suitable for unsynchronized transmissions, i.e. transmissions lacking a passive mechanical synchronizer in the form of a synchronizing sleeve, in which the neutral position is intended to be used temporarily while shifting to/from the first gear combination from/to the second gear combination, i.e. for a very short period of time in comparison with the first and second gear combinations. The neutral position is in this case used while speeds of the gearwheels of the new gear combination synchronize so that the new gear combination can be engaged by moving the shift rod to the first or second predetermined position. By providing mechanical engagement means for preventing the shift rod from moving when in the first or the second predetermined position, it is ensured that the actuator is not overheated and thereby destroyed, since the first and second gear combinations are intended to be engaged during a significantly longer period of time than the neutral position has to be maintained.

The shift rod may engage the first and second gear combinations via other members, such as via a slidable or a pivotable shift fork, a sleeve, etc.

The fluid pressure typically acts on at least one piston of the actuator, which piston is mechanically connected to the shift rod. The actuator may be a hydraulic or a pneumatic actuator. A variety of different actuator configurations are possible. A combination of different actuators may be used, or all actuators may be of the same type. Each actuator may comprise a double-acting cylinder in which at least one piston is arranged, delimiting two filling chambers. The actuator also comprises at least one valve for introducing fluid, such as compressed air or hydraulic fluid, to initiate a movement of the at least one piston, thereby initiating movement of the shift rod. The actuator further comprises at least one valve for discharging fluid as a gear has been engaged. The valves for introducing and discharging fluid may of course be combined, or separate valves may be provided. The valves may be two-way valves or three-way valves.

The actuator/s may advantageously comprise three-position cylinder/s in which at least two pistons are arranged and for which three defined stroke lengths can be attained.

Optionally, the neutral position is located between the first position and the second position.

Optionally, the transmission is adapted to maintain the neutral position of the shift rod by balancing fluid pressures acting on the shift rod in opposite directions. For this purpose, the actuator may comprise two filling chambers that push the piston and thereby the shift rod towards the neutral position from opposite directions. An actuator having a three-position cylinder setup is herein advantageous, since the mechanical design of a three-position cylinder allows the piston to find a defined neutral position when both filling chambers are equally pressurized.

Optionally, the transmission is adapted to maintain the neutral position at least for a time period sufficient for synchronizing rotational speeds as necessary for engaging a desired one of the first and the second gear combinations. This may typically be a time period of less than 1 second (s). The transmission may thereby be provided without a mechanical synchronizer for synchronizing rotational speeds when switching between the first and the second gear combinations.

Optionally, the transmission control unit is configured to:
detect that a gear shift between the first and the second gear combinations is desired, and in response thereto control the actuator to move the shift rod to the neutral position and maintain it temporarily in the neutral position,
with the shift rod in the neutral position, detect that a predetermined gear engagement condition is fulfilled, and in response thereto control the actuator to engage the desired gear combination.

The transmission control unit may be adapted to detect that the predetermined gear engagement condition is fulfilled when rotational speeds of gearwheels of the desired gear combination have been synchronized as necessary for engaging the desired gear combination. This is particularly useful when the transmission does not comprise any mechanical synchronizer for synchronizing the gearwheels.

Optionally, the actuator comprises:
a first filling chamber,
a second filling chamber,
at least one valve for fluidly connecting the first filling chamber and the second filling chamber to a pressurized fluid system,
a piston assembly arranged between the first and second filling chambers, the piston assembly being mechanically connected to the shift rod,
wherein the transmission control unit is configured to control the at least one valve.

The valve or valves may be of "normally open" or "normally closed" type. Many different configurations are possible, for example a single valve or a combination of valves for fluidly connecting both filling chambers to the pressurized fluid system may be provided, or a single valve per filling chamber, or more than one valve per chamber. The piston assembly may comprise at least one piston, such as one, two or three pistons.

Optionally, the transmission control unit is configured to actively control the fluid pressure acting on the shift rod by adjusting a duty cycle of a pulse width modulation (PWM) signal controlling the at least one valve to maintain the neutral position of the shift rod. This provides efficient pressure control. The duty cycle is the percentage of a total cycle time that the valve is powered and can be expressed as $D=PW/T\times100\%$, where D is the duty cycle, PW is the pulse width, and T is the period of the signal.

By way of example, the at least one first valve may comprise a single first valve movable between an inlet and an outlet position, and the at least one second valve may comprise a single second valve movable between an inlet and an outlet position, in which case the transmission control unit is configured to actively control the fluid pressure acting on the shift rod by adjusting the duty cycles of the PWM signals controlling the first valve and the second valve, respectively. The first valve and the second valve may herein be of the normally open type, i.e. valves configured to be in an open position when the valve is not powered, i.e. energised. Herein, the "normally open" position is the outlet position, i.e. fluid may flow out of the respective filling chambers whenever the valves are not powered. Thus, the valves may herein be two-way valves movable between the inlet and the outlet position.

Optionally, the transmission control unit is configured to, if the predetermined gear engagement condition is not fulfilled within a predetermined time period, such as within 5 s or less, or 2 s or less, or 1 s or less, reduce the duty cycle of the pulse width modulation signal controlling the at least one valve, such as the first valve and the second valve, respectively, if separate valves are provided per filling chamber. This will lower the load on the valve(s) of the actuator and prevent overheating. However, it must be ensured that the shift rod does not start to drift away from the neutral position, such as by using a position sensor or similar. If a signal from the position sensor indicates that the shift rod drifts away from the neutral position, the transmission control unit may be configured to increase the duty cycle again.

Optionally, the transmission control unit is configured to reduce the duty cycle of the PWM to a predetermined value or by a predetermined amount sufficient to maintain the neutral position of the shift rod. This ensures that the shift rod does not start to drift out of the neutral position while the load on the actuator valves can be reduced. Alternatively, the PWM duty cycle may be reduced based on feedback from a position sensor sensing a position of the shift rod, wherein the duty cycle is increased again if the shift rod starts to drift.

Optionally, the at least one valve comprises a first normally closed inlet valve for fluidly connecting the first filling chamber to the pressurized fluid system, a first normally closed outlet valve for venting the first filling chamber, a second normally closed inlet valve for fluidly connecting the second filling chamber to the pressurized fluid system, and a second normally closed outlet valve for venting the second filling chamber. When all the valves are in their closed position, the neutral position of the shift rod may be maintained, given that the filling chambers have been pressurized to balance the shift rod prior to closing the valves. By "normally closed" is herein intended that the valve is configured to be in the closed position when the valve is not powered/energized. Thus, in this embodiment, the neutral position can be maintained without risking overheating of the valves. Movement of the piston/shift rod as a result of leakage can be detected using e.g. a position sensor and compensated by activating one or more of the valves as needed.

Optionally, the mechanical engagement means comprises at least one spring-loaded first engagement member configured to engage with one of at least two corresponding second engagement members so as to maintain the shift rod in one of the first position and the second position at least when no fluid pressure is applied by the actuator. Such a spring-loaded engagement member efficiently maintains the first and second positions without having to apply fluid pressure by means of the actuator and thereby load the valves. The spring force is selected so that it is overcome by the force applied by the actuator when a gear shift is desired. Advantageously, the spring-loaded engagement member is in the form of a spring plunger, such as a ball plunger, fixed to the transmission housing and the second engagement members are recesses provided on the shift rod. Such mechanical engagement means may also be referred to as ball detents.

Optionally, at least one of the first gear combination and the second gear combination is an unsynchronized gear combination. By an unsynchronized gear combination is intended that no passive mechanical synchronizer, such as a synchronizer ring, is provided for synchronizing the rotational speeds. This is a robust and relatively compact configuration allowing versatility in the gear shifting process.

Optionally, the first gear combination is a low range gear combination, and the second gear is a high range gear combination. Thus, the actuator and the shift rod are used for changing between a high range and a low range of the transmission. Usually, when a mechanical synchronizer is provided, a neutral position is not needed for the range gear. However, if no synchronizer is provided, it will be necessary to temporarily maintain a neutral position while awaiting synchronization of rotational speeds during gear shifting between the low range and the high range gear combinations, in which case it will be useful to maintain the neutral position solely by applying fluid pressure.

According to a second aspect of the invention, a vehicle comprising a transmission according to the first aspect is provided. The vehicle may by way of example be a heavy-duty vehicle such as a truck, a bus, or a working machine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
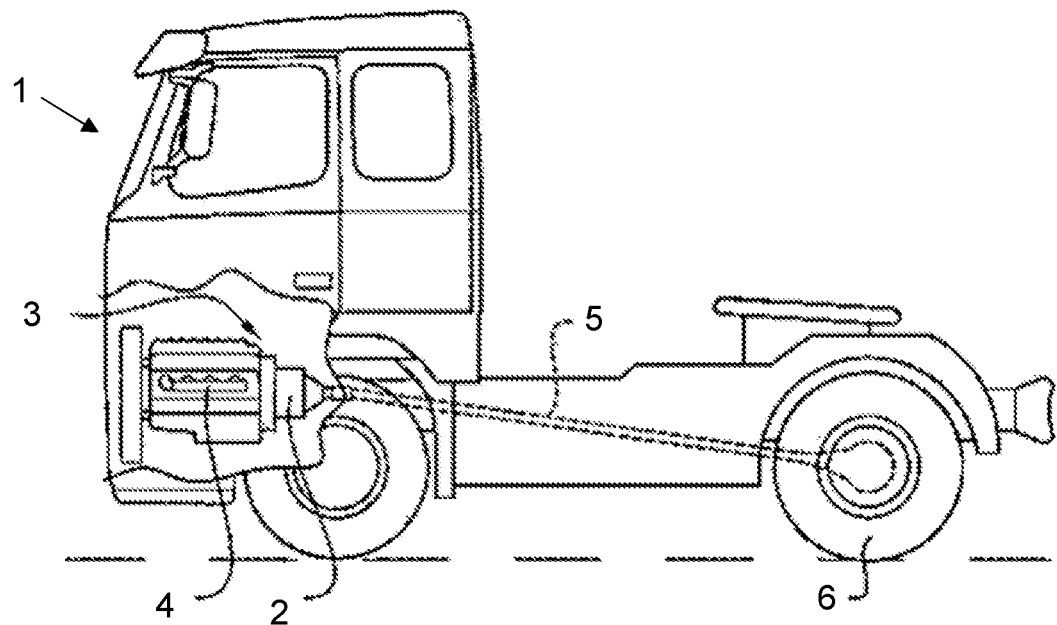
FIG. 1 is a side view of a vehicle in which a method according to the invention may be applied.

The drawings show diagrammatic exemplifying embodiments of the present invention and are thus not necessarily drawn to scale. It shall be understood that the embodiments shown and described are exemplifying and that the invention is not limited to these embodiments.

It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 depicts a vehicle 1 according to an example embodiment of an aspect of the present invention. The vehicle 1 is here a heavy-duty truck, more specifically a towing truck, or tractor, for pulling one or more trailers (not shown). As mentioned in the above, the vehicle may be any type of vehicle, including but not limited to buses, wheel loaders, excavators, passenger cars etc.

The vehicle 1 comprises a powertrain 3 with a propulsion unit 4, which here is an internal combustion engine (ICE), and a transmission 2 according to an example embodiment of the invention drivingly connected to the propulsion unit 4. The vehicle 1 further comprises a propeller shaft 5 which drivingly connects the transmission 1 to driven wheels 6 of the vehicle 1. The driven wheels 6 are here the rear wheels of the truck 1. The propeller shaft 5 is drivingly connected to the driven wheels 6 via e.g. a differential (not shown). Even though driven wheels 6 are shown in this embodiment, it shall be understood that any other type of ground engaging means may be used, such as crawler members of an excavator.

Figure 2:
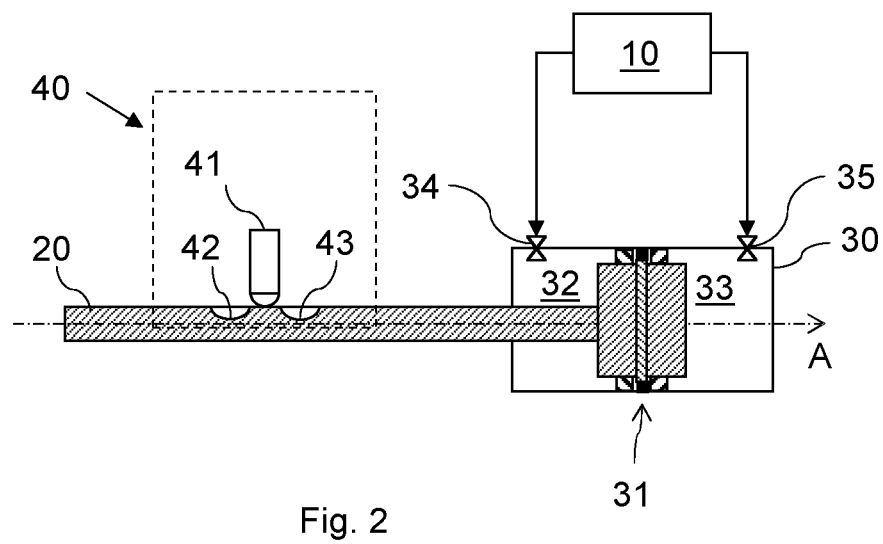
FIG. 2 is a schematic drawing of parts of a transmission according to a first embodiment of the invention.

FIG. 2 schematically illustrates parts of an automated manual transmission according to an embodiment of the invention, such as of the transmission 2 illustrated in FIG. 1. The transmission comprises a transmission control unit 10, a shift rod 20, and an actuator 30 controllable by the transmission control unit 10. The shift rod 20 is movable back and forth in an axial direction A by means of the actuator 30 in response to signals from the transmission control unit 10. The shift rod 20 is movable between a predetermined first position in which it engages a first gear combination (not shown) of the transmission 2, a predetermined second position in which it engages a second gear combination (not shown) of the transmission 2. The first and second gear combinations are arranged to transmit torque from an input shaft (not shown) of the transmission 2 to an output shaft (not shown) thereof. The shift rod 20 is further movable to a predetermined neutral position, located between the first and second positions, in which no gear combination is engaged and consequently no torque is transmitted between the propulsion unit 4 and the driven wheels 6.

To be able to engage a gear combination, the shift rod 20 is mechanically connected to a shift fork or similar (not shown), in turn arranged to act on e.g. a sleeve member so as to drivingly engage a gear combination. In the neutral position, the shift rod 20 does not engage any gear, i.e. no torque is transmitted between the propulsion unit 4 and the driven wheels 6.

The actuator 30 is arranged to apply a fluid pressure acting on the shift rod 20 in response to signals from the transmission control unit 10, thereby initiating a gear shift. As schematically illustrated, the actuator 30 comprises a cylinder with a first filling chamber 32 and a second filling chamber 33 provided on opposite sides of a piston assembly 31, mechanically connected to the shift rod 20. The piston assembly 31 herein comprises a left hand piston, a main piston and a right-hand piston, although the configuration of the piston assembly may be varied depending on actuator type. A first valve 34 and a second valve 35 are provided for fluidly connecting the first and second filling chambers 32, 33, respectively, to a pressurized fluid system (not shown). The transmission control unit 10 is configured to control the first valve 34 and the second valve 35, thereby controlling the pressure in the chambers 32, 33 and the position of the piston assembly 31. Although separate valves 34, 35 for the respective filling chambers 32, 33 are illustrated in FIG. 2, it is instead possible to provide a single valve or a combination of valves for providing and releasing fluid to/from the filling chambers 32, 33. The valve or valves 34, 35 may be controlled by means of pulse width modulation (PWM) signals from the transmission control unit 10.

A mechanical engagement means 40 is provided for maintaining the first and second positions of the shift rod 20 without applying any fluid pressure by means of the actuator 30. In the shown embodiment, the mechanical engagement means 40 comprises a spring-loaded first engagement member 41, such as a spring-loaded ball, mounted to a transmission housing (not shown). The spring-loaded first engagement member 41 is configured to engage with one of two corresponding second engagement members 42, 43 in the form of recesses, or detents, formed in the shift rod 20, thereby maintaining the first and second positions, respectively.

The transmission 2 is adapted to maintain the neutral position of the shift rod 20 solely by applying fluid pressure acting on the shift rod 20 by means of the actuator 30. In other words, there is no mechanical engagement means provided for maintaining the neutral position of the shift rod 20. Instead, the transmission 2 maintains the neutral position of the shift rod 20 by balancing the fluid pressures acting on the piston assembly 31, and thereby the shift rod 2, in opposite directions. When the filling chambers 32, 33 are equally pressurized, the fluid therein pushes the shift rod 20 towards the neutral position from opposite directions.

In the first position, the first engagement member 41 engages the second engagement member 42, and the first gear combination is used for driving the propulsion shaft 5 of the vehicle 1. To initiate a gear shift from the first gear combination to the second gear combination, the second filling chamber 33 is pressurized via the second valve 35 so that the spring force of the first engagement member 41 is overcome and the shift rod 20 moves backward in the axial direction A to the neutral position. A position sensor (not shown) may be provided, signalling the position of the shift rod 20 to the transmission control unit 10. The transmission control unit 10 maintains the neutral position by controlling the valves 32, 33 until a predetermined gear engagement condition for engaging the second gear combination is achieved, such as the rotational speeds being synchronized. For this purpose, the transmission control unit 10 controls the first valve 34 to balance the pressure of the fluid in the second filling chamber 33 by pressurizing the first filling chamber 32. Once the necessary synchronization is achieved, as determined for example using rotational speed sensors, the first valve 34 is controlled to release fluid from the first filling chamber 32 while the second valve 35 is controlled to pressurize the second filling chamber 33 so that the shift rod 20 moves further backward until the first engagement member 41 engages the second engagement member 43 in the second position. To change back to the first gear combination, a reverse operation is performed.

In the embodiment shown in FIG. 2, the first filling chamber 32 is fluidly connected to a pressurized fluid system (not shown) by means of the single first valve 34, i.e. a combined inlet/outlet valve, such as a two-way valve movable between an inlet and an outlet position, wherein the outlet position is a default position assumed by the valve when it is not electrically powered/energized ("normally open"), and wherein the inlet position is assumed by powering the valve 34 by means of signals from the control unit 10. The second filling chamber 33 is fluidly connected to the pressurized fluid system by means of the single second valve 35, which is of the same type as the first valve 34. The transmission control unit 10 is configured to actively control the fluid pressure acting on the shift rod 20 by adjusting a duty cycle of the PWM signals from the transmission control unit 10 controlling the first valve 34 and the second valve 35, respectively, to maintain the neutral position of the shift rod 20. By way of example, for rapid gear shifts, 100% PWM duty cycle may be used, in which case both filling chambers 32, 33 are fully pressurized by a constant pressure. However, if the predetermined gear engagement condition is not fulfilled within a predetermined time period, for example if synchronization is not achieved, the duty cycle may be reduced so as to reduce the load on the valves 34, 35. The duty cycle may advantageously be reduced so that the piston assembly 31 does not move back and forth, such as equally reduced on both sides, depending on the actuator configuration. The duty cycle may be reduced to a predetermined value, or by a predetermined amount, which is sufficient to maintain the neutral position of the shift rod 20. Alternatively, the duty cycle of one or both valves 34, 35 may be reduced based on feedback from the previously mentioned position sensor, wherein the duty cycle or duty cycles is/are increased again if the shift rod 20 starts to drift.

Figure 3:
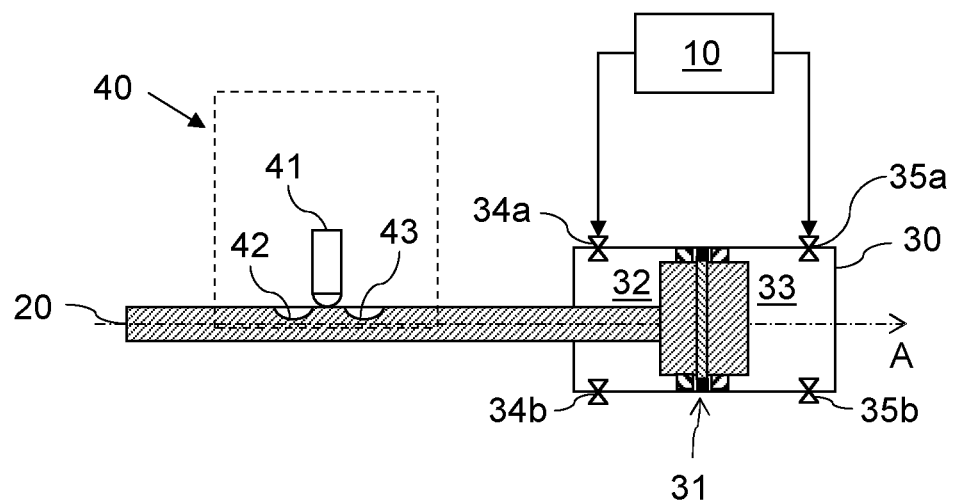
FIG. 3 is a schematic drawing of parts of a transmission according to a second embodiment of the invention.

FIG. 3 schematically illustrates parts of an automated manual transmission according to another embodiment of the invention. The embodiment shown in FIG. 3 differs from the embodiment shown in FIG. 2 in the configuration of the valves. Instead of providing a single valve per filling chamber 32, 33, a separate first and second inlet valve 34*a*, 35*a* and a first and second outlet valve 34*b*, 35*b* are provided for each one of the filling chambers 32, 33, respectively. In this embodiment, the valves may be of the "normally closed" type, i.e. when no PWM signal is applied by the transmission control unit 10, the valves 34*a*, 34*b*, 35*a*, 35*b* are all closed so that no fluid can be introduced or released from the filling chambers 32, 33. Thus, the fluid pressures acting on the piston assembly 31 can remain balanced in the absence of a PWM signal. To open a valve, a PWM signal is applied by the transmission control unit 10. Thus, to initiate a gear shift from the first gear combination to the second gear combination, the second filling chamber 33 is pressurized via the second inlet valve 35*a* and/or the first outlet valve 34*a* is controlled to its open position. Once the neutral position is reached, the PWM signal may be turned off and all valves 34*a*, 34*b*, 35*a*, 35*b* remain closed until the predetermined gear engagement condition is fulfilled. One fulfilled, the first outlet valve 34*b* is controlled to release fluid from the first filling chamber 32. Optionally, also the second inlet valve 35*a* may be controlled to pressurize the second filling chamber 33 in order to achieve a quicker response. To change back to the first gear combination, a reverse operation is performed.

The electronic transmission control unit 10 may include a microprocessor, a microcontroller, a programmable digital signal processor or another programmable device. Thus, the electronic transmission control unit 10 comprises electronic circuits and connections (not shown) as well as processing circuitry (not shown) such that the electronic transmission control unit 10 can communicate with different parts of the vehicle 1 or with different control units of the vehicle 1, such as with various sensors, systems and control units, in particular with one or more electronic control units (ECUs) controlling electrical systems or subsystems in the vehicle, such as an engine control unit. The electronic transmission control unit 10 may comprise modules in either hardware or software, or partially in hardware or software, and communicate using known transmission buses such a CAN-bus and/or wireless communication capabilities. The processing circuitry may be a general-purpose processor or a specific processor. The electronic transmission control unit 10 comprises a non-transitory memory for storing computer program code and data. Thus, the skilled person realizes that the electronic transmission control unit 10 may be embodied by many different constructions.

It is to be understood that the present invention is not limited to the embodiments described above and illustrated in the drawings; rather, the skilled person will recognize that many changes and modifications may be made within the scope of the appended claims.

The invention claimed is:

1. An automated manual transmission, comprising:
    a transmission control unit,
    a shift rod movable between a predetermined first position in which it engages a first gear combination of the transmission, a predetermined second position in which it engages a second gear combination of the transmission, and a predetermined neutral position in which it does not engage any gear,
    an actuator for moving the shift rod between the first position, the second position and the neutral position by applying a fluid pressure acting on the shift rod in response to signals from the transmission control unit,
    mechanical engagement means for maintaining the first and second positions of the shift rod without applying any fluid pressure by means of the actuator,
    wherein the transmission is adapted to maintain the neutral position of the shift rod solely by applying fluid pressure acting on the shift rod by means of the actuator.

2. The transmission according to claim 1, wherein the neutral position is located between the first position and the second position.

3. The transmission according to claim 2, wherein the transmission is adapted to maintain the neutral position of the shift rod by balancing fluid pressures acting on the shift rod in opposite directions.

4. The transmission according to claim 1, wherein the transmission is adapted to maintain the neutral position at least for a time period sufficient for synchronizing rotational speeds as necessary for engaging a selected one of the first and the second gear combinations.

5. The transmission according to claim 1, wherein the transmission control unit is configured to:
    detect that a gear shift between the first and the second gear combinations is desired, and in response thereto control the actuator to move the shift rod to the neutral position and maintain it temporarily in the neutral position,
    with the shift rod in the neutral position, detect that a predetermined gear engagement condition is fulfilled, and in response thereto control the actuator to engage the selected gear combination.

6. The transmission according to claim 1, wherein the actuator comprises:
    a first filling chamber,
    a second filling chamber,
    at least one valve for fluidly connecting the first filling chamber and the second filling chamber to a pressurized fluid system,
    a piston assembly arranged between the first and second filling chambers, the piston assembly being mechanically connected to the shift rod,
    wherein the transmission control unit is configured to control the at least one valve.

7. The transmission according to claim 6, wherein the transmission control unit is configured to actively control the fluid pressure acting on the shift rod by adjusting a duty cycle of a pulse width modulation (PWM) signal controlling the at least one valve to maintain the neutral position of the shift rod.

8. The transmission according to claim 7, wherein the transmission control unit is further configured to:
    detect that a gear shift between the first and the second gear combinations is desired, and in response thereto control the actuator to move the shift rod to the neutral position and maintain it temporarily in the neutral position,
    with the shift rod in the neutral position, detect that a predetermined gear engagement condition is fulfilled, and in response thereto control the actuator to engage the selected gear combination, and
    wherein the transmission control unit is configured to, if the predetermined gear engagement condition is not fulfilled within a predetermined time period, reduce the duty cycle of the pulse width modulation signal controlling the at least one valve.

9. The transmission according to claim 8, wherein the transmission control unit is configured to reduce the duty cycle of the pulse with modulation signal to a predetermined value or by a predetermined amount sufficient to maintain the neutral position of the shift rod.

10. The transmission according to claim 6, wherein the at least one valve comprises a first normally closed inlet valve for fluidly connecting the first filling chamber to the pressurized fluid system, a first normally closed outlet valve for venting the first filling chamber, a second normally closed inlet valve for fluidly connecting the second filling chamber to the pressurized fluid system, and a second normally closed outlet valve for venting the second filling chamber.

11. The transmission according to claim 1, wherein the mechanical engagement means comprises at least one spring-loaded first engagement member configured to engage with one of at least two corresponding second engagement members so as to maintain the shift rod in one of the first position and the second position at least when no fluid pressure is applied by the actuator.

12. The transmission according to claim 1, wherein at least one of the first gear combination and the second gear combination is an unsynchronized gear combination.

13. The transmission according to claim 1, wherein the first gear combination is a low range gear combination and the second gear is a high range gear combination.

14. A vehicle comprising a transmission according to claim 1.

* * * * *